United States Patent [19]
Christopher et al.

[11] 3,817,330
[45] June 18, 1974

[54] SECONDARY RECOVERY METHOD

[75] Inventors: Charles A. Christopher, Houston; Joseph C. Allen, Bellaire, both of Tex.; Jack H. Kolaian, Wappingers Falls, N.Y.

[73] Assignee: Texaco Inc., New York, N.Y.

[22] Filed: Mar. 29, 1972

[21] Appl. No.: 239,334

[52] U.S. Cl. .................................. 166/275, 166/274
[51] Int. Cl. ................................................ E21b 43/22
[58] Field of Search .......................... 166/273–275, 166/292; 252/8.55 D

[56] References Cited
UNITED STATES PATENTS

| | | | |
|---|---|---|---|
| 2,920,041 | 1/1960 | Meadors | 166/275 |
| 3,377,275 | 4/1968 | Michalski et al. | 252/8.55 D |
| 3,713,489 | 1/1973 | Fast et al. | 166/274 X |

OTHER PUBLICATIONS

The Condensed Chemical Dictionary, Sixth Edition, Reinhold Publishing Co., New York, page 293.

*Primary Examiner*—Stephen J. Novosad
*Attorney, Agent, or Firm*—Thomas H. Whaley; C. G. Reis

[57] ABSTRACT

A novel method of secondary recovery of oil from subterranean reservoirs is provided wherein a fluid is used to drive the oil in the reservoir to production wells. This driving fluid is a mixture of water and colloidal silica. The driving fluid has a mobility ratio relative to the oil in the reservoir such that the driving fluid will maintain a flat face against the oil being driven to production wells and thus a high sweep efficiency of the reservoir will result.

6 Claims, No Drawings

SECONDARY RECOVERY METHOD

BACKGROUND OF THE INVENTION

In an oil reservoir which has been produced to the point that it is deficient in natural energy; it is often desirable to institute secondary recovery methods to recover the large amount of oil still left in the reservoir. Most secondary recovery operations are generally carried out by injecting an extraneous fluid into the reservoir which will then migrate to an output well driving the oil ahead of it. The oil is then recovered at the output well. Even after most secondary recovery operations about one-half of the oil is left behind in the reservoir. The inefficiency of the displacement process in secondary recovery operations is mainly due to two retentive forces, viscosity and capillarity.

If the viscosity of the fluid displacing the reservoir oil to the production wells is lower than the reservoir oil, premature breakthrough of the driving fluid into the production wells will occur. The displacing fluid actually fingers through the reservoir oil and proceeds to the production well before an adequate portion of the reservoir has been swept. This is referred to in terms of sweep efficiency. The effects of viscosity on sweep efficiency may be described in terms of the mobility ratio. The mobility ratio is defined by the following equation:

$$M = (K_2/u_2)/(K_1/u_1)$$

where
- $M$ = mobility ratio
- $u_2, u_1$ = viscosity of displacing fluid and displaced fluid (oil), respectively:
- $K_2, K_1$ = permeability of the formation with respect to the displacing fluid and the displaced fluid respectively.

At high mobility ratios the phenomenon commonly known as fingering occurs and the displacing fluid does not display a flat front to the reservoir oil, but instead, rushes ahead at various points in finger like protrusions which may prematurely break through to the production wells. The oil in areas not touched by the "fingers" of displacing fluid are usually left unrecovered in pockets in the reservoir. The preceeding equation shows that the mobility ratio and the degree of fingering is directly proportional to the ratio of the displaced fluid viscosity to the displacing fluid viscosity, $u_1/u_2$. Since most displacing fluids are less viscous than the displaced fluid, oil, the mobility ratio will usually be quite high, and a poor areal sweep efficiency will occur because of fingering.

Polymeric compounds which increase the viscosity of the displacing fluid so as to lower the mobility ratio and increase the sweep efficiency of the displacing fluid have been developed and used in recent years. For example, U.S. Pat. No. 3,039,529 discloses the use of polyacrylamide solutions to increase the viscosity of the displacing fluid. Also, U.S. Pat. No. 3,581,824 discloses the use of polysaccharides for the same purpose. Although these polymers are useful for increasing the viscosity of the driving fluid they are expensive. Also, the displacing fluid containing these polymers tends to decrease in viscosity as it travels through the reservoir away from the injection well bore. This, of course, causes the mobility ratio to rise and increases the likelihood that fingering will occur.

The method of our invention solves these problems by providing an injection or displacing fluid which will not decrease in viscosity as it moves away from the injection well bore.

SUMMARY OF THE INVENTION

The invention is a method for recovering oil from subterranean oil reservoirs which is penetrated by at least one injection well and at least one production well wherein a fluid is injected into the injection well and oil is produced from the production well. The fluid comprises an intimate mixture of water and colloidal silica.

DESCRIPTION OF THE PREFERRED EMBODIMENTS

THE FLUID

The preferred injection fluid useful in the process of our invention comprises an intimate mixture of water and colloidal silica such that the dispersion of the colloidal silica in the water is stable and not subject to separation into distinct phases.

The water may be fresh or mineral ladened as, for example, salt water obtained from a formation in the vicinity of oil bearing zones. The water selected should be compatible with the formation it is to be injected into so that harmful swelling, for instance, will not occur.

The colloidal silica useful in our invention is different from precipitated silica or silica gel. The colloidal silica useful in our invention is a fumed silica which is made up of chain-like formations sintered together. These chains are branched and have enormous external surface areas of from about 50 to about 400 meters$^2$/gram. Each segment in the chain has many hydroxyl (OH) groups attached to silicon atoms at the surface. When the segments come into proximity to each other, these hydroxy groups will bond to each other by hydrogen bonding to form a three dimensional network.

Colloidal silicas are readily available from manufacturers. One source is the Cabot Corporation of Boston, Massachusetts under the trade name CAB-O-SIL. Colloidal silica is also available from other commercial sources and the reference to one source is not intended to limit the scope of our invention.

When the silica particles are dispersed in a liquid medium, the network structure formed by the silica particles restricts the movement of the molecules of the liquid medium. This results in an increase in the viscosity of the liquid.

The colloidal silica acceptable for use in the method of this invention should have a particle size ranging from about 7 to 15 millimicrons (mu). In this size range the colloidal silica will pass through even reservoirs with very small pore size. For example, a reservoir having very low permeability of say 0.016 millidarcies (md) has a correspondingly small pore size of 25 to 100 mu. Thus, the colloidal silica suitable for use in the process of this invention will pass through even the smallest pores encountered in hydrocarbon reservoirs and will maintain a constant viscosity in the driving fluid.

The thickening efficiency of the silica is directly related to the polarity of the liquid to be thickened. The use of selected additives (surfactants and/or multifunctional compounds) can increase the thickening efficiency of the silica. In the case of thickening a hydrocarbon solvent, these additives react with the interface between the silica and the solvent and increase the degree to which the silica particles form the three dimensional network. This allows less silica to be used to achieve equivalent thickening of the solvent. Usually less than 0.5 percent of the additive based on the weight of total liquid to be thickened will achieve marked increases in viscosity.

For liquids of high polarity such as water, aldehydes, ketones, etc., cationic and nonionic surfactants, e.g., oleoyl trimethylene diamine and nonyl polyethoxy ethanols can cause dramatic increases in viscosity. Low polarity or non-polar liquids, such as hydrocarbons, are thickened by the use of anionic surfactants such as sodium linear allylate sulfonate and multifunctional compounds such as ethylene glycol.

Depending on the system, dramatic changes in viscosity can occur by using two additives such as a nonionic surfactant, and a cationic type.

The multifunctional compounds mentioned above fall into the general class of compounds with a plurality of groups available for hydrogen bonding. Examples of such compounds are amines, ethylene glycol, glycerine, and propylene glycol.

The surfactant which may be used in the injection fluid of our invention may broadly be any compound which reduces surface tension of the water, thus reducing the surface tension between the water and the reservoir oil. Soap may be used, for instance, the sodium salts of high molecular weight alkyl sulfates or sulfonates. Also very useful are nonionic surfactants which are usually a reaction product of a hydrophobic and a hydrophilic material, such as the reaction product between mono-alkyl phenols and ethylene oxide.

Other ingredients may be used in the fluid of this invention to give it additional benefits without detracting from the scope and benefits already described.

Also, a solvent may be added to the fluid of this invention which is miscible with the reservoir oil. Examples of suitable hydrocarbons are aromatics such as benzene and toluene and aliphatics such as LPG, propane, butane, isobutane, pentane, isopentane, and hexane. Also, any mixture of suitable hydrocarbon solvents which when mixed retain their miscibility characteristics with the reservoir oil are acceptable.

Other additional ingredients may also be envisioned which would be acceptable. For example, an inert gas could be added to the fluid. Such a gas could be nitrogen or methane for example.

The fluid of our invention should be adjusted in viscosity so that the mobility ratio is not less than about 0.1 nor more than about 10. At the higher mobility ratios fingering will have more of a tendency to occur and at the lower mobility ratios the fluid will become progressively more viscous and difficult to pump. It is especially preferred that the mobility ratio range from about 0.9 to about 3.

Of course, once the desired mobility ratio is known, the necessary viscosity of the fluid may easily be calculated. The viscosity of the fluid described in our invention may be tailored to fit the needs of the user by variations of ingredients. Due to the number of ingredients, a detailed explanation of methods of varying viscosity is impractical to give. However, it will be evident to one skilled in the art what effect each ingredient has on the viscosity so that an infinite number of fluids may be made which will fall within the scope of our invention.

USE OF THE FLUID

A firm gel of the fluid to be used may be prepared by mixing water, colloidal silica and a surfactant and/or a multifunctional compound if needed. If a less firm gel is desired the surfactant and multifunctional compound may be reduced or eliminated. This gel may then be reduced to the proper viscosity with more water, which thickens the fluid to a point due to hydrogen bonding, above which additional water thins it. The amounts of water to be used will depend on the amounts of the other ingredients and the ingredients themselves. The gel may also be reduced in viscosity by adding hydrocarbon solvent.

The fluid of this invention is then injected into the reservoir in order to displace the oil in the reservoir to production wells. The fluid of our invention may conceivably be the only fluid injected into the formation but considering its relatively expensive character and the vast quantities which would be needed to flood an entire oil reservoir, it is preferred to use the fluid of our invention as a slug. A slug of the fluid of our invention would be injected into the reservoir followed by another fluid. The trailing fluid may be water, gas or some treated fluid.

The thickened slug of our invention may be used according to standard methods of fluid displacement. The lower mobility of the slug of our invention will remove problems of fingering and overriding encountered with conventional fluids such as water. It is within the skill of the art to determine the proper slug size and rate of displacement to be used.

The fluid of this invention provides an improvement over the polymer thickened fluids in shear resistance. When polymer thickened fluids are subjected to the tremendous shear forces present as they are pushed through the reservoir rock they lose viscosity, particularly in the vicinity of the well bore, and the mobility ratio rise results in possible fingering effects. However, the fluid of our invention does not lose appreciable viscosity due to shear forces.

Injection of the fluid of this invention may be in a secondary recovery operation or in a tertiary recovery operation. For example, after a conventional water flood or polymer flood or any other secondary recovery operation the fluid of this invention may be injected to remove additional hydrocarbons.

EXPERIMENTAL

I. Preparation of a Typical Fluid of Our Invention 300 milliliters of water and 30 grams of colloidal silica were mixed at 16,000 revolutions per minute in a waring blender. A thickened liquid of 8 centipoise resulted. This fluid would be acceptable for injection.

II. Effect of Additives

To investigate the effect of additives, 5 drops of a nonionic surfactant were added to the mixture of colloidal silica and water described in I. Immediately upon mixing a firm gel formed too viscous to measure. The addition of 100 ml of water and 10 g. of sodium chloride did not effect the gel.

III. Preparation of a Fluid of Our Invention Containing Various Ingredients 200 ml of n-hexane was measured into a waring blender with 4 grams of colloidal silica. After blending for 1 minute at 16,000 rpm, a soft gel formed. While blending 3 ml of a nonionic surfactant, 3 ml of glycerine, and 20 ml of water were added. A firm gel formed. 1,000 ml of n-hexane and 210 ml of water were added with blending. The viscosity of the mixture was about 160 cp.

A fluid made as described above has remained stable for about a year.

We claim:

1. A method for recovering oil from subterranean oil bearing reservoirs comprising:
   a. penetrating the reservoir with at least one injection well and one production well which are in fluid communication with the reservoir and
   b. injecting into the injection well a thickened fluid comprising an intimate mixture of water and colloidal silica, said colloidal silica being made up of chain-like formations sintered together, said chains being branched and having external surface area of from about 50 to about 400 meters $^2$/gram and having hydroxyl groups attached to silicon atoms at the surface enabling hydrogen bonding to form a three dimensional network and
   c. producing oil from the production well.

2. A method as in claim 1 wherein the injected fluid is injected as a slug.

3. A method as in claim 2 wherein the injected fluid comprises an intimate mixture of water, a surfactant and colloidal silica.

4. In a method for recovering oil from subterranean oil bearing reservoirs wherein at least one injection well and one production well are in fluid communication with said reservoir and an injection fluid is injected into the injection well and oil is produced from the production well the improvement which comprises:

injecting a thickened fluid comprising an intimate mixture of water and colloidal silica, said colloidal silica being made up of chain-like formations sintered together, said chains being branched and having external surface area of from about 50 to about 400 meters $^2$/gram and having hydroxyl groups attached to silicon atoms at the surface enabling hydrogen bonding to form a three dimensional network.

5. A method as in claim 4 wherein the fluid is injected as a slug.

6. A method as in claim 5 wherein the injected fluid comprises an intimate mixture of water, a surfactant and colloidal silica.

* * * * *